United States Patent
Balachandran et al.

(10) Patent No.: US 10,117,287 B2
(45) Date of Patent: Oct. 30, 2018

(54) METHOD AND APPARATUS FOR IMPROVED DUAL CONNECTIVITY

(71) Applicant: Alcatel-Lucent USA Inc., Murray Hill, NJ (US)

(72) Inventors: Krishna Balachandran, Morganville, NJ (US); Joseph H. Kang, Belle Mead, NJ (US); Kemal M. Karakayali, Highland Park, NJ (US); Kiran M. Rege, Marlboro, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 14/469,161

(22) Filed: Aug. 26, 2014

(65) Prior Publication Data

US 2016/0066233 A1    Mar. 3, 2016

(51) Int. Cl.
   *H04W 4/00*      (2018.01)
   *H04W 76/16*     (2018.01)
   *H04W 76/12*     (2018.01)
   *H04W 76/02*     (2009.01)

(52) U.S. Cl.
   CPC ......... *H04W 76/16* (2018.02); *H04W 76/026* (2013.01); *H04W 76/022* (2013.01); *H04W 76/12* (2018.02)

(58) Field of Classification Search
   None
   See application file for complete search history.

(56) References Cited

U.S. PATENT DOCUMENTS

| | | | | |
|---|---|---|---|---|
| 5,325,362 A | * | 6/1994 | Aziz | H04L 12/4633 370/405 |
| 2009/0245150 A1 | * | 10/2009 | Tsao | H04L 12/289 370/311 |
| 2011/0296006 A1 | * | 12/2011 | Krishnaswamy | H04L 29/12952 709/224 |
| 2012/0106554 A1 | * | 5/2012 | Ng | H04W 76/041 370/392 |
| 2014/0023042 A1 | * | 1/2014 | Westberg | H04W 36/0011 370/331 |
| 2015/0043350 A1 | * | 2/2015 | Basilier | H04L 63/0272 370/235 |

* cited by examiner

*Primary Examiner* — Willie J Daniel, Jr.
(74) *Attorney, Agent, or Firm* — Harness, Dickey & Pierce, P.L.C.

(57) ABSTRACT

Various methods and devices are provided to address the need for improved dual connectivity. For example, a network node (500) in a primary network includes a processing unit (501) and an interface unit (510), which includes a network interface (511) for communication with other network devices. The processing unit is communicatively coupled to the interface unit and configured to receive, from a user equipment (UE) via the interface unit, a secondary Internet Protocol (IP) address for the UE, the secondary IP address being associated with a secondary network of the UE. The processing unit is also configured to initiate via the interface unit the establishment of at least one tunnel to bridge the network node and the UE via the secondary network.

12 Claims, 5 Drawing Sheets

METHOD AND APPARATUS FOR IMPROVED DUAL CONNECTIVITY

FIELD OF THE INVENTION

The present invention relates generally to communications and, in particular, to dual connectivity in wireless communication systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

Rapidly increasing demand for mobile data applications coupled with limited licensed spectrum availability has led to significant interest in the deployment heterogeneous networks comprising mixtures of macro-cells and small cells. Often these small cells support radio access technologies that are different from those supported by macro cells. For instance, the macro cells may offer wireless access based on the 3GPP LTE standards while the small cells offer WIFI access which not only uses different frequency bands but also an entirely different air interface standard. Since a large number of users are typically connected to macro cells (which cover relatively large geographic areas), the bit rates and the overall quality of experience available to users connected to macro cells are usually lower than those available to users connected to small cells. At present, users can benefit from the presence of small cells through hard handoffs. That is, if a user connected to a macro cell is in the vicinity of a small cell, it may break its existing connection to the macro cell and establish a new connection to the nearby small cell. The quality of experience for a user can vary significantly when it hands over from a small cell to a macro cell and vice versa. Such handovers can also be disruptive to the applications that are running on the user device.

Dual Connectivity (DC), which is being standardized by 3GPP in its upcoming releases, has been proposed as a means to overcome these problems and enable user devices to opportunistically benefit from the presence of small cells with minimal disruption to their active applications. DC allows a user device to be anchored to a cell, usually a macro cell supporting the 3GPP LTE access standard, while opportunistically setting up a secondary connection to another cell, often a small cell, should it be in the vicinity of the latter. The other cell providing the secondary connection can be on the same or different frequency band as the primary cell. Also, the air interface supported by the secondary cell can be the same as that associated with the primary air interface or different from the latter. An example of the latter would be where the primary air interface is 3GPP LTE while the secondary air interface is WIFI. Dual connectivity with primary and secondary connections supported by different radio access technologies (air interfaces) is called Multi-Radio-Access-Technology Dual Connectivity or Multi-RAT DC for short. New solutions and techniques that support and improve such Multi-RAT DC operation would therefore meet a need and advance wireless communications generally.

Figure 1:
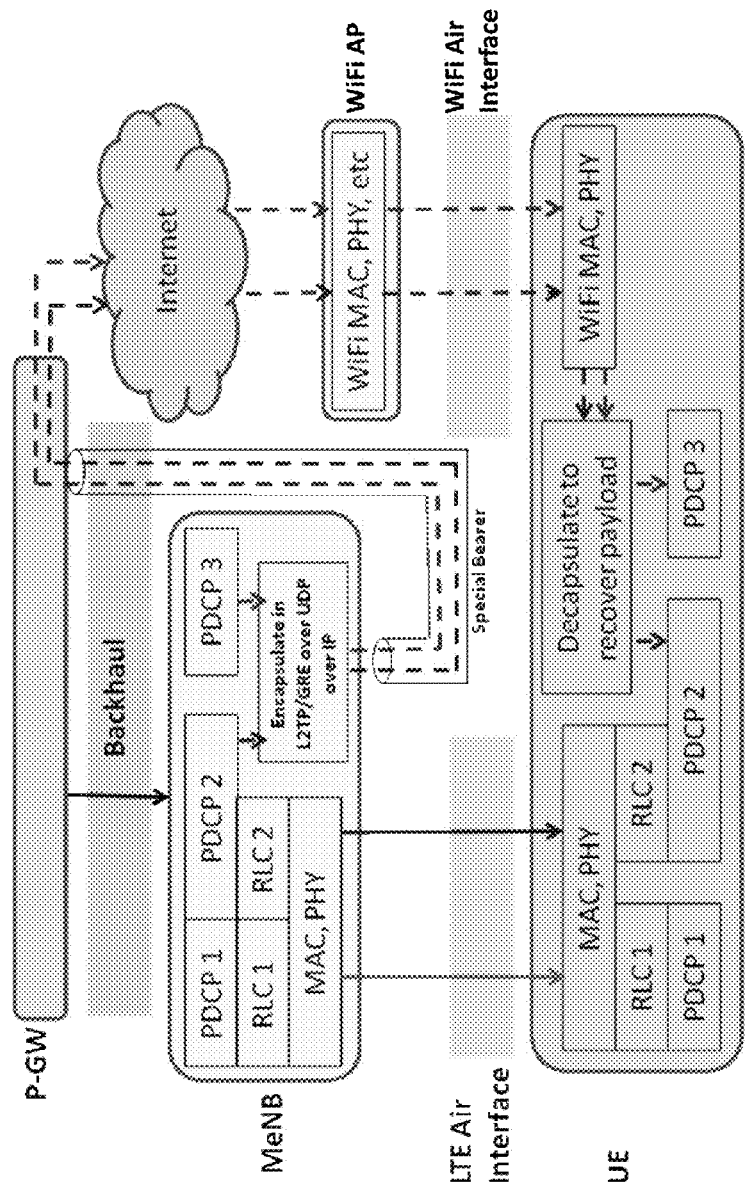
FIG. 1 is a block diagram depiction of a dual connectivity architecture in accordance with various embodiments in which Radio Access Bearers (RABs) are split at the Packet Data Convergence Protocol (PDCP) layer.

Specific embodiments of the present invention are disclosed below with reference to FIGS. 1-5. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, subdivided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY

Various methods and devices are provided to address the need for improved dual connectivity. In one method, a network node in a primary network receives from a user equipment (UE) a secondary Internet Protocol (IP) address for the UE. This secondary IP address is associated with a secondary network of the UE. The establishment of at least one tunnel is then initiated to bridge the network node and the UE via the secondary network. An article of manufacture is also provided, the article comprising a non-transitory, processor-readable storage medium storing one or more software programs which when executed by one or more processors performs the steps of this method.

Many embodiments are provided in which the method above is modified. For example, in many embodiments initiating the establishment of at least one tunnel involves initiating the establishment of a tunnel between the secondary IP address and an IP address associated with the network node. In some embodiments, initiating the establishment of at least one tunnel involves initiating the establishment of back-to-back tunnels bridging the secondary IP address and an IP address associated with the network node. Depending on the embodiment, the network node in the primary network may comprise a wireless transceiver node. In such an embodiment, the secondary IP address may be received via a wireless connection between the wireless transceiver node and the UE. In other embodiments, the network node may comprise a gateway. In many embodiments, the network node also conveys at least one Radio Access Bearer (RAB) identifier to the UE for use in communication via the at least one tunnel and conveys an indication of which protocol layer will be producing the data communicated via the at least one RAB. This indication of protocol layer may be an indication of either a Radio Link Control (RLC) layer or a Packet Data Convergence Protocol (PDCP) layer, for example.

A network node apparatus is also provided. The network node being in a primary network and including a processing unit and an interface unit, which includes a network interface for communication with other network devices. The processing unit is communicatively coupled to the interface unit and configured to receive, from a user equipment (UE) via the interface unit, a secondary Internet Protocol (IP) address for the UE, the secondary IP address being associated with a secondary network of the UE. The processing unit is also configured to initiate via the interface unit the establishment of at least one tunnel to bridge the network node and the UE via the secondary network.

Many embodiments are provided in which this network node is modified. For example, depending on the embodiment, the network node in the primary network may comprise a wireless transceiver node. In such an embodiment, the secondary IP address may be received via a wireless connection between the wireless transceiver node and the UE. In other embodiments, the network node may comprise a gateway. Additional examples of embodiments can be found described above with respect to the method.

DETAILED DESCRIPTION OF EMBODIMENTS

To provide a greater degree of detail in making and using various aspects of the present invention, a description of our approach to dual connectivity and a description of certain, quite specific, embodiments follow for the sake of example. FIGS. 1-4 are referenced in an attempt to illustrate some examples of specific embodiments of the present invention.

At present, wireless user devices benefit from the presence of small cells through hard handovers, which can be disruptive to the applications that are active on those devices. It also delivers a rather uneven experience to the end user. Multi-RAT dual connectivity (DC) has been proposed as a way to address these problems and an improved DC architecture is described below.

Consider an example situation where a wireless network comprising macro cells with a 3GPP LTE air interface provides primary access to user devices. Overlaid on this network is a set of small cells with WIFI access points. Our focus in this example is on user devices capable of multi-RAT dual connectivity that connect to the macro cells for their primary connections and the WIFI access points for their secondary connections. Assume that such a user device is connected to a macro cell with which it has established its primary (and, for now, only) connection. We refer to the macro cell to which the user device is connected as the latter's primary access point. The primary connection is being used to support control traffic as well as data traffic; Radio Access Bearers (RABs) with appropriate features have been established between the user device and the Radio Access Network (RAN) to carry the control and data traffic. The user device (i.e., user equipment) has a primary IP address that has been given to it by the 3GPP LTE network.

Now assume that the user device comes into the vicinity of a WIFI access point and detects the presence of the latter through some received signal measurement process. (Such processes are commonly used by present-day wireless devices that are capable of multi-mode operation, e.g. 3GPP LTE and WIFI.) At this point, the user device goes through the standard connection establishment procedure to set up a WIFI connection between itself and the WIFI access point. As part of this connection establishment procedure, it receives another IP address from the WIFI access point. We refer to this IP address as the secondary IP address of the user device. We have assumed here that the user device autonomously performs received signal measurements from WIFI access points and establishes a (secondary) connection with one if it finds itself in the vicinity of one of these access points. It is also possible to perform this measurement and connection establishment process under the direction of the user device's primary access point (i.e., the 3GPP LTE macro cell).

Once the user device acquires a secondary IP address (from the WIFI access point), it sends a message to its primary access point informing the latter of the fact that the user device now has a secondary connection. The message contains the secondary IP address acquired by the user device from the WIFI access point. The message is sent over a control channel via the user device's primary connection. Once the macro cell, i.e. the primary access point of the user device, receives the message, it initiates signaling between itself and the user device to establish a tunnel between itself (i.e., the macro cell) and the user device that goes via the user device's secondary access point, i.e. the WIFI access point in this example. The user device's secondary IP address is used as the destination IP address whereas an IP address associated with the macro cell is used as the origination IP address in this signaling exchange. Note that since IP networking extends only up to the PDN GateWay (P-GW), a special bearer is set up between the macro cell and the P-GW to carry control and data packets between these points (namely, the macro cell and the P-GW.) This special bearer extends over the backhaul network and provides functionality to identify different Radio Access Bearers (RABs), e.g. via header fields.

The packets carrying signaling messages to establish the tunnel between the macro cell and the user device are carried over the special bearer until they reach the P-GW, following which they are forwarded towards the user device (via the latter's secondary access point) using standard IP routing. The tunnel established between the macro cell and the user device can be of any convenient type that allows tunneled data to be forwarded using standard IP routing. For instance, one can set up an L2TP or a GRE tunnel between the macro cell and the user device. While a GRE tunnel requires less overhead compared to an L2TP tunnel, the latter includes a header field that can be used to identify different streams carried within the tunnel. This feature is useful for identifying different RABs that one may establish between the macro cell and the user device. Since a GRE tunnel does not provide such a capability, an additional layer of encapsulation may have to be used to identify different RABs between the macro cell and the user device. The procedures for establishing tunnels and their operation are well known in the art.

The macro cell sets up different RABs between itself and the user device to carry different kinds of data. Some of these RABs may go entirely over the primary connection, some may go entirely over the secondary connection, while some may be split between the primary and secondary connections. The tunnel set up between the macro cell and the user device is used to carry data belonging to those RABs that go either entirely via the secondary connection or those that may be split between the primary and secondary connections. The RABs that are split between the primary and secondary connections can be split at any convenient protocol layer. For instance, this split can occur at the Packet Data Convergence Protocol (PDCP) layer or the Radio Link Control (RLC) layer as shown diagrams 100 and 200 of FIGS. 1 and 2.

Figure 2:
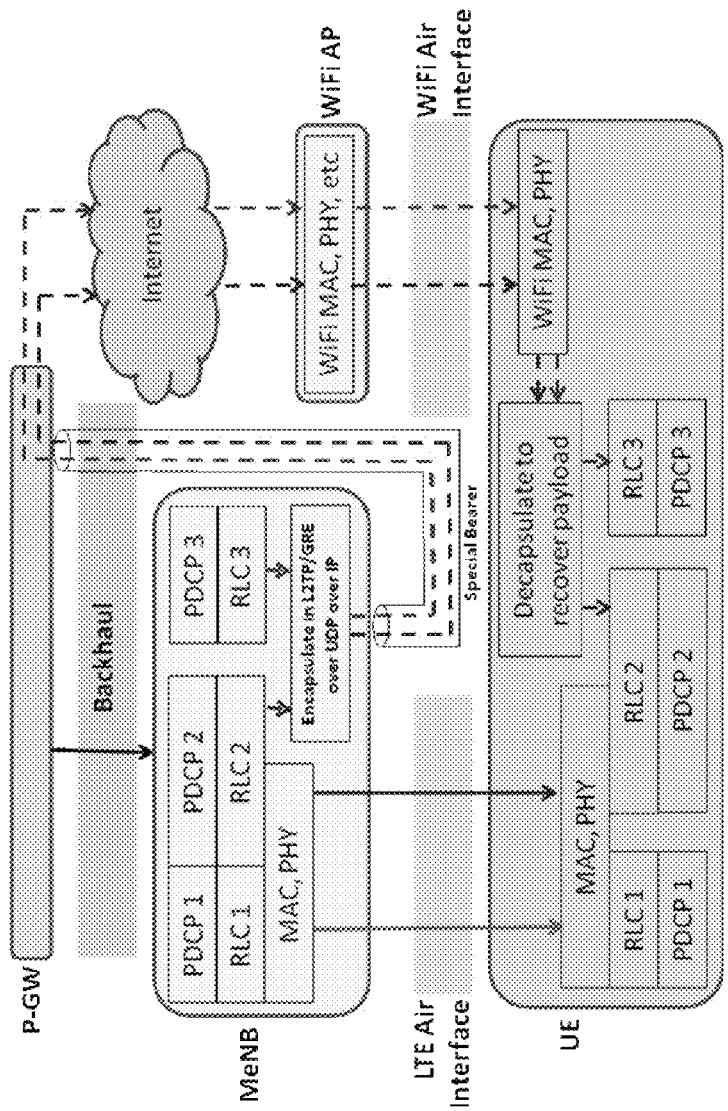
FIG. 2 is a block diagram depiction of a dual connectivity architecture in accordance with various embodiments in which RABs are split at the Radio Link Control (RLC) layer.

When a RAB carrying data entirely or partially over the secondary connection is being set up, the macro cell informs the user device of the identifier to be used for this RAB by the tunneling mechanism. As mentioned earlier, if an L2TP tunnel is being used, the RAB identifier may be carried in the field used to distinguish different streams within the L2TP tunnel. If a GRE tunnel is being used, the identifier may have to be carried in the extra encapsulation provided for this tunnel. The user device may also have to be informed of the protocol layer that is the producer (and consumer) of the corresponding data. For instance, in the case of a RAB being split at the RLC layer, the producer of the downlink data carried over the tunnel would be the RLC entity at the macro cell while the consumer would be the corresponding RLC entity at the user device. Diagrams 100 and 200 of FIGS. 1 and 2 illustrate proposed architectures in accordance with various embodiments in which RABs are split at the PDCP and RLC layers, respectively.

We now describe how data transfer may take place using an illustrative example. Consider a scenario where a user device has a multi-RAT DC connection with a 3GPP LTE macro cell as its primary access point and a WIFI node as its secondary access point. Assume that a RAB carrying data associated with an application has been split between the primary and secondary connections and that the split occurs at the PDCP layer. Assume furthermore that a tunnel (including the special bearer) has been established between the macro cell and the user device to carry data between the two. In view of the discussion in the previous paragraph, an identifier will have been assigned to identify data associated with this RAB, and the user device will have been informed of the protocol entities (i.e., PDCP entities in the present example) that will be the producer and consumer of the data associated with that identifier.

Now consider an event where the macro cell receives a packet to be delivered to the user device on the RAB that is split between the primary and secondary connections. The macro cell, specifically the PDCP entity corresponding to that RAB, adds the appropriate PDCP encapsulation (header, trailer, etc.) and then decides whether the packet should be sent via the primary connection or the secondary connection. If it decides to do the former, it merely hands the packet down to the local RLC entity that is associated with the RAB, and the packet is delivered to the user device via the primary connection in accordance with the standard 3GPP LTE procedure. If, on the other hand, the PDCP entity at the macro cell decides to transmit the packet via the secondary connection, the following steps may be taken: After adding the PDCP encapsulation and creating a PDCP Protocol Data Unit (PDU), the PDCP entity wraps the packet in the appropriate tunneling encapsulation (treating the PDCP PDU as the payload to be delivered to the tunnel destination) and then transmits the resulting packet to the P-GW (i.e., the Internet edge) over the special bearer set up to carry packets associated with the RAB between the macro cell and the P-GW. At the end of this special bearer, the P-GW extracts the packet with the tunneling encapsulation, and forwards it towards the tunnel destination by handing it to the local router. From this point on, the packet with tunneling encapsulation follows standard IP packet forwarding to find its way to the WIFI access point that is the secondary access point of the user device. Note that in an alternative implementation, the tunneling encapsulation may be added at the P-GW (instead of at the macro cell).

When the WIFI access point receives this packet, it treats it like any IP packet destined for the user device, and transmits it to the latter over the WIFI air interface. Note that the destination IP address for the tunnel is the secondary IP address associated with the user device (which was given to it by the WIFI access point). When the user device receives the packet with the tunneling encapsulation, it extracts its payload (the PDCP PDU) and hands it to the appropriate local PDCP entity based on the RAB identifier used by the tunnel. The PDCP entity at the user device treats it like any PDCP PDU that has been received over the corresponding RAB, so that it carries out appropriate processing and hands the contents of the packet to the higher layer. Uplink data packets going over the secondary connection follow the same path in the reverse direction between the user device and its primary access point where the higher protocol layers are terminated. Note that the ability of the tunnels to carry uplink traffic (in addition to downlink traffic) is particularly useful in several scenarios where, because of the link asymmetry between the primary and secondary cells (e.g. primary stronger on the downlink whereas the secondary is stronger on the uplink), it would be more convenient to carry most of the uplink traffic via the secondary connection. Thus, it is important to recognize that the scope of the present invention includes uplink as well as downlink connections.

The example implementation described above is consistent with the flat architecture advocated by 3GPP LTE, where base stations terminate all of the protocol layers up to PDCP. A consequence of this implementing approach is that all data connections to the user device, whether they go over the primary connection or the secondary connection, get anchored at the primary access point, i.e. the macro cell in the present example. This is illustrated in diagrams 100 and 200 of FIGS. 1 and 2, in which the master eNodeB (MeNB) is depicted as the primary access point.

This leads to a rather inefficient use of the backhaul links for traffic using the secondary connection. In order to see this, consider the path of a downlink data packet that ends up using the secondary connection. When such a packet arrives at the P-GW (over the Internet), it uses the backhaul links to reach the macro cell, which is the primary access point of the corresponding user device. If the macro cell decides to send it to the user device via the secondary connection, it sends it back to the P-GW over the special bearer, and then the P-GW forwards it over the Internet (using the tunnel to the user device) towards the user device. Thus, the packet ends up using the backhaul links twice, once in each direction. In order to avoid this wasteful usage of the backhaul links, one may implement the present invention by anchoring the data connections (i.e. placing the point at which the primary and secondary connections come together) at the P-GW, which lies at the boundary between the Internet and the radio access network.

Figure 3:
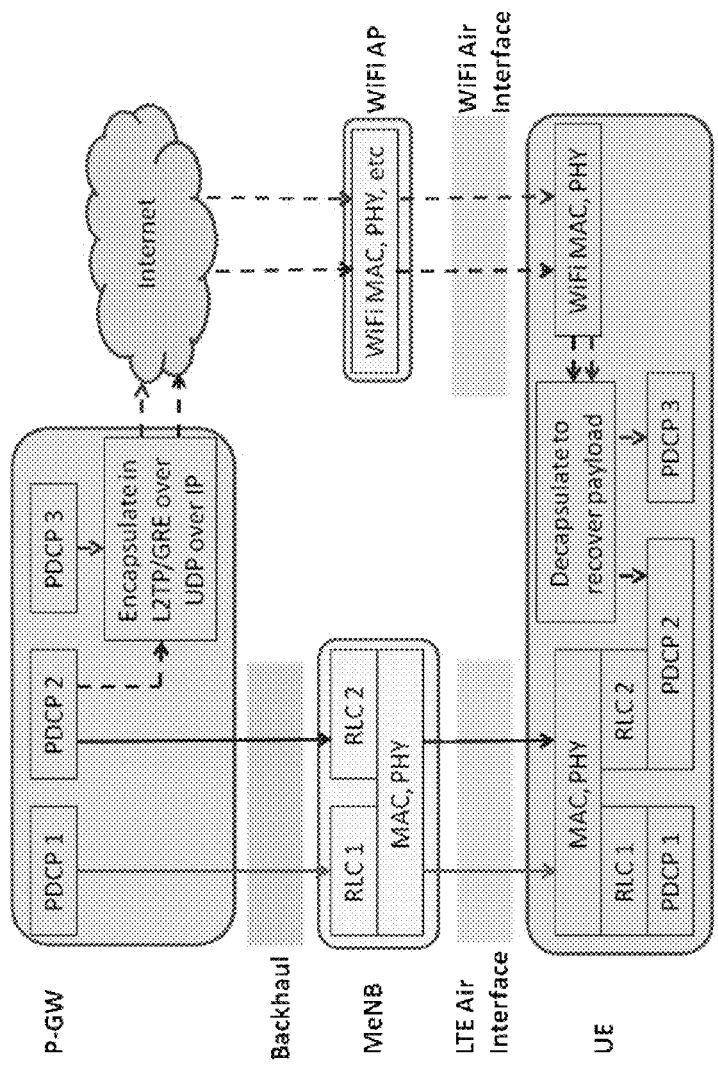
FIG. 3 is a block diagram depiction of a dual connectivity architecture in accordance with various embodiments having anchoring at the PDN GateWay (P-GW) and RABs split at the PDCP layer.
Figure 4:
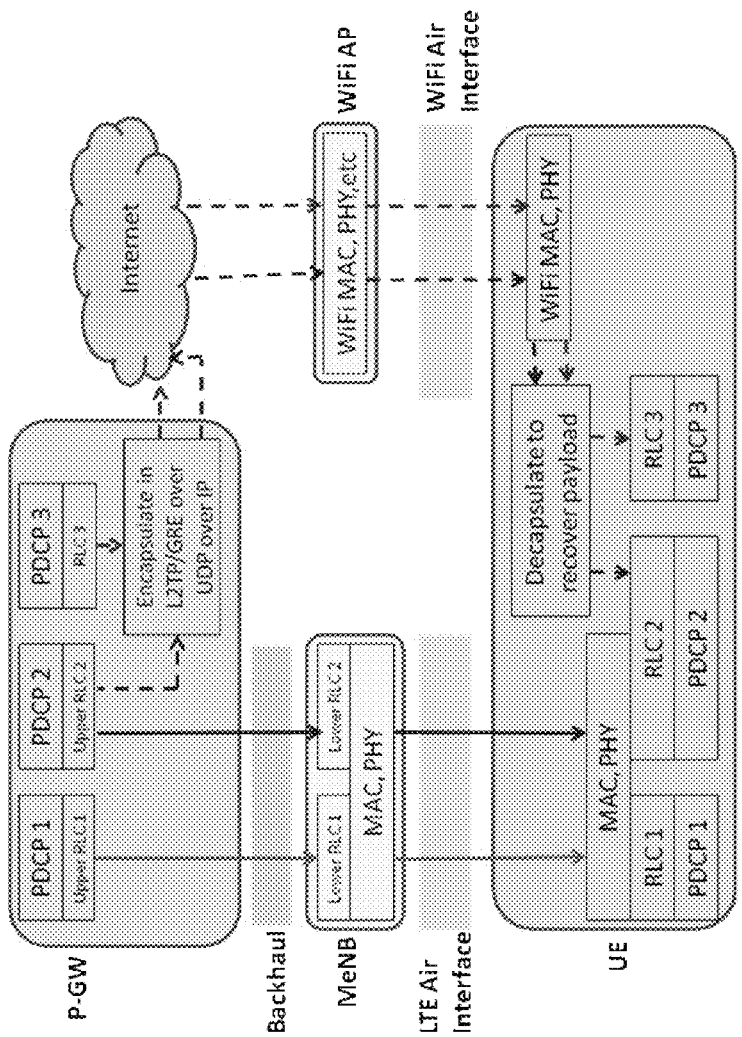
FIG. 4 is a block diagram depiction of a dual connectivity architecture in accordance with various embodiments having anchoring at the P-GW and RABs split at the RLC layer.

Diagrams 300 and 400 of FIGS. 3 and 4 depict architectures in which the connections are anchored at the P-GW and the RABs are split at the PDCP and the RLC layers, respectively. It is easy to see that since P-GW resides at the edge of the Internet where IP forwarding is available, there is no need to establish special bearers to carry packets to the edge of the Internet. One can also see that the backhaul links are not used to carry user data packets that go over the secondary connection. It is also possible to place the anchoring point at any network node lying between the macro cell and the P-GW if such a placement is convenient from some point of view. Thus, the anchoring network node might be anything from a wireless transceiver node on up the network to a gateway. All such embodiments are envisioned as possible alternatives for improving dual connectivity generally.

Other variations are also possible. One such variation is where instead of running an end-to-end tunnel between the anchoring point and the user device, we have "back-to-back" tunnels with one tunnel running between the anchoring point and the secondary access point and the other between the secondary access point and the user device. An advantage of using such back-to-back (or tandem) tunnels is that they allow the secondary access point to intervene in events such as those where data packets destined for the user device accumulate at the secondary access point (because of, say, poor link quality) and have to be cleaned up to avoid the slowing of the data transfer. A disadvantage is that such tunnels would require the secondary access point to be explicitly involved in the tunnel establishment procedure, which would impact the overall signaling protocol.

Note also that the descriptions of the various embodiments given above assume a dual connectivity system wherein a UE can have one primary connection and one secondary connection, the present invention applies equally to more general systems that allow more than one secondary connection. Thus, the scope of the invention includes all multi-RAT systems that allow a primary connection and one or more secondary connections.

The detailed and, at times, very specific description above is provided to effectively enable a person of skill in the art to make, use, and best practice the present invention in view of what is already known in the art. In the examples, embodiments of the present invention are described in the context of specific architectures, specific system configurations and specific wireless signaling technologies for the purpose of illustrating possible implementations and a best mode for the present invention. Thus, the examples described should not be interpreted as restricting or limiting the scope of the broader inventive concepts.

Figure 5:
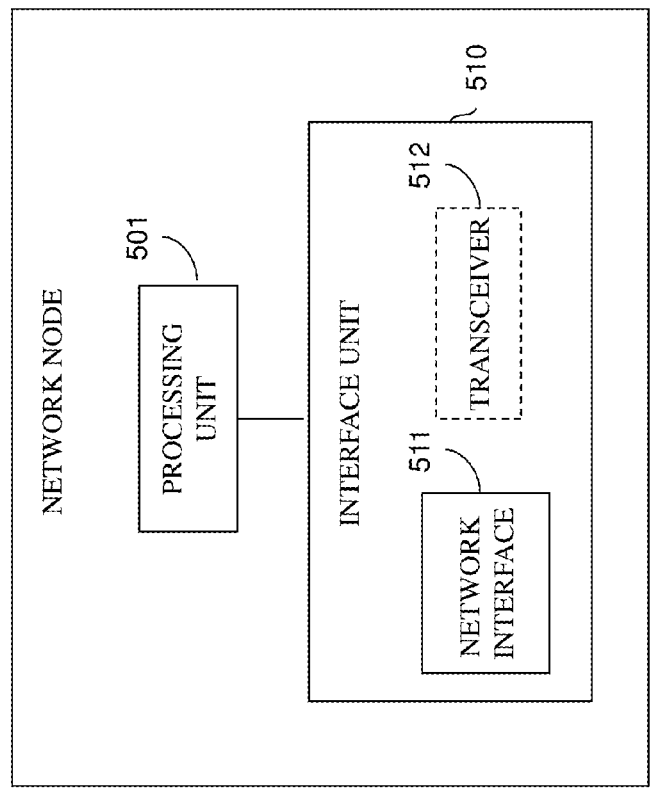
FIG. 5 is a block diagram depiction of a network node in accordance with various embodiments of the present invention.

Having described certain embodiments in detail above, a review of the more general aspects common to many of the embodiments of the present invention can be understood with reference to FIG. 5. FIG. 5 is a block diagram depiction of a network node 500 in accordance with various embodiments of the present invention.

Network node 500 includes processing unit 501 and interface unit 510, which includes network interface 511 for communication with other network devices. In some embodiments, but not all, network node 500 also includes wireless transceiver 512. For example, in some embodiments network node 500 may comprise a gateway, which does not include a wireless transceiver, while in other embodiments network node 500 may comprise a wireless transceiver node.

Those skilled in the art will recognize that the depiction of network node 500 in FIG. 5 does not show all of the components necessary to operate in a commercial communications system but only those components and logical entities particularly relevant to the description of embodiments herein. For example, network nodes are known to comprise processing units, network interfaces, and wireless transceivers. In general, such components are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, network node 500, for example, represents known devices that have been adapted, in accordance with the description herein, to implement multiple embodiments of the present invention. Furthermore, those skilled in the art will recognize that aspects of the present invention may be implemented in and/or across various physical components and none are necessarily limited to single platform implementations.

In the example of FIG. 5, network node 500 is in a primary network. Processing unit 501 receives from a UE a secondary IP address for the UE, the secondary IP address being associated with a secondary network of the UE. Depending on the embodiment, processing unit 501 may receive the secondary IP address via transceiver 512 and a wireless connection between the network node and the UE, or alternatively, processing unit 501 may receive the secondary IP address via network interface 511 and other network devices between the network node and the UE.

Processing unit 501 is also configured to initiate via the interface unit the establishment of at least one tunnel to bridge the network node and the UE via the secondary network. In many embodiments this involves initiating the establishment of a tunnel between the secondary IP address and an IP address associated with the network node. In other embodiments, this may involve initiating the establishment of back-to-back tunnels bridging the secondary IP address and an IP address associated with the network node. Also, depending on the embodiment, initiating the establishment of at least one tunnel may involve initiating the establishment of a special bearer between the network node and a gateway. In many embodiments, processing unit 501 is also configured to convey at least one Radio Access Bearer (RAB) identifier to the UE for use in communication via the at least one tunnel and to convey an indication of which protocol layer (RLC or PDCP, e.g.) will be producing the data communicated via the at least one RAB.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method comprising:
   receiving, from a user equipment (UE) by a network node in a primary network, a secondary Internet Protocol (IP) address for the UE, the secondary IP address being associated with a secondary network of the UE, each of the primary network and the secondary network supported by a different radio access technology;
   establishing at least one tunnel between the primary network and the secondary network to bridge the network node and the UE via the secondary network, the at least one tunnel including a special bearer to carry control and data packets between the network node and a gateway to the primary network;
   conveying, by the network node to the UE, (i) an identifier of at least one radio access bearer for use in identifying encapsulated packets communicated via the at least one tunnel, and (ii) an indication of which protocol layer will be producing data communicated via the at least one radio access bearer;
   receiving, by the network node, a packet to be delivered to the UE on a radio access bearer split between the primary and secondary networks;
   encapsulating the received packet according to a tunneling protocol for the at least one tunnel; and
   forwarding the encapsulated packet from the network node to the secondary network through the at least one tunnel.

2. The method as recited in claim 1, wherein the establishing at least one tunnel comprises:
   establishing a tunnel between the secondary IP address and an IP address associated with the network node.

3. The method as recited in claim 1, wherein the establishing at least one tunnel comprises:
   establishing back-to-back tunnels bridging the secondary IP address and an IP address associated with the network node.

4. The method as recited in claim 1, wherein
   the network node in the primary network includes a wireless transceiver node; and
   the receiving the secondary IP address includes receiving the secondary IP address via a wireless connection between the wireless transceiver node and the UE.

5. The method as recited in claim 1, wherein the conveying an indication of which protocol layer comprises:
   conveying an indication of a protocol layer from the group of a Radio Link Control (RLC) layer and a Packet Data Convergence Protocol (PDCP) layer.

6. A non-transitory, processor-readable storage medium storing one or more software programs which when executed by one or more processors causes the one or more processors to perform a method comprising:
   receiving, from a user equipment (UE) by a network node in a primary network, a secondary Internet Protocol (IP) address for the UE, the secondary IP address being associated with a secondary network of the UE, each of the primary network and the secondary network supported by a different radio access technology;
   establishing at least one tunnel between the primary network and the secondary network to bridge the network node and the UE via the secondary network, the at least one tunnel including a special bearer to carry control and data packets between the network node and a gateway to the primary network;
   conveying, by the network node to the UE, (i) an identifier of at least one radio access bearer for use in identifying encapsulated packets communicated via the at least one tunnel, and (ii) an indication of which protocol layer will be producing data communicated via the at least one radio access bearer;
   receiving, by the network node, a packet to be delivered to the UE on a radio access bearer split between the primary and secondary networks;
   encapsulating the received packet according to a tunneling protocol for the at least one tunnel; and
   forwarding the encapsulated packet from the network node to the secondary network through the at least one tunnel.

7. A network node in a primary network, the network node comprising:
   a network interface configured to communicate with other network devices; and
   at least one processor communicatively coupled to the network interface, the at least one processor configured to execute computer-readable instructions to,
   receive, from a user equipment (UE) by a network node in network interface, a secondary Internet Protocol (IP)

address for the UE, the secondary IP address being associated with a secondary network of the UE, each of the primary network and the secondary network supported by a different radio access technology;

establish, via the network interface, at least one tunnel between the primary network and the secondary network to bridge the network node and the UE via the secondary network, the at least one tunnel including a special bearer to carry control and data packets between the network node and a gateway to the primary network;

convey, via the network interface to the UE, (i) an identifier of at least one radio access bearer for use in identifying encapsulated packets communicated via the at least one tunnel, and (ii) an indication of which protocol layer will be producing data communicated via the at least one radio access bearer;

receive, via the network interface, a packet to be delivered to the UE on a radio access bearer split between the primary and secondary networks;

encapsulate the received packet according to a tunneling protocol for the at least one tunnel; and where the network interface is further configured to forward the encapsulated packet from the network node to the secondary network through the at least one tunnel.

8. The network node as recited in claim 7, wherein the at least one processor is further configured to execute computer-readable instructions to establish a tunnel between the secondary IP address and an IP address associated with the network node.

9. The network node as recited in claim 7, wherein the at least one processor is further configured to execute computer-readable instructions to establish back-to-back tunnels bridging the secondary IP address and an IP address associated with the network node.

10. The network node as recited in claim 7, wherein the network node further includes a wireless transceiver.

11. The network node as recited in claim 7, wherein
  the network node in the primary network includes a wireless transceiver node; and
  the at least one processor is further configured to receive the secondary IP address via a wireless connection between the wireless transceiver node and the UE.

12. The network node as recited in claim 7, wherein the at least one processor is configured to execute computer-readable instructions to convey an indication of a protocol layer from the group of a Radio Link Control (RLC) layer and a Packet Data Convergence Protocol (PDCP) layer.

* * * * *